(12) United States Patent
Harder et al.

(10) Patent No.: US 6,432,529 B1
(45) Date of Patent: Aug. 13, 2002

(54) NON-FOGGING ADHESIVE TAPE

(75) Inventors: Christian Harder, Bredkamp; Stephan Zöllner, Hamburg; Jürgen Sievers, Quickborn; Bernd Dietz, Ammersbeck; Frank Ganschow, Elmshorn; Andreas Kummer, Rönneburger Kirchenweg, all of (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/253,213

(22) Filed: Feb. 19, 1999

(30) Foreign Application Priority Data

Feb. 24, 1998 (DE) .......................................... 198 07 752

(51) Int. Cl.$^7$ ................ C09J 7/02; C09J 7/04
(52) U.S. Cl. ............... 428/355 AC; 428/343; 428/346; 428/355 R; 442/150; 442/151; 427/208.2; 427/208.4
(58) Field of Search ................ 428/343, 345, 428/355 R, 355 AC, 346, 354; 442/150, 151; 427/208.2, 208.4

(56) References Cited

U.S. PATENT DOCUMENTS 4,226,671 A * 10/1980 Christensen .............. 159/47 R
4,952,459 A * 8/1990 Thatcher ..................... 428/426
5,194,455 A * 3/1993 Massow et al. ............. 522/152
5,681,654 A 10/1997 Mamish et al. ............. 428/354

FOREIGN PATENT DOCUMENTS

| DE | 4324748 | 10/1994 | |
| DE | 4313008 | 11/1994 | .......... C09J/133/06 |
| EP | 0578151 | 1/1994 | .......... C09J/133/08 |
| EP | 0621326 | 10/1994 | ............ C09J/7/02 |
| WO | 9518844 | 7/1995 | ............ C09J/7/04 |

OTHER PUBLICATIONS

Database Rapra, abstract of Zusammenfassung & Specialty Tapes, Adhesive Age 34, No. 8, (Jul. 1991) page 6.
Derwent Abstract No. 84–259395/42 JP 59–156746 (Sep. 25, 1993).
Derwent Abstract No. 85–173633/29 JP 60–101042 (Sep. 25, 1993).
U.S. application No. 08/847,395, Harder et al., filed Apr. 24, 1997.

* cited by examiner

Primary Examiner—Daniel Zirker
(74) Attorney, Agent, or Firm—Norris McLaughlin & Marcus

(57) ABSTRACT

Non-fogging self-adhesive tape comprising a non-fogging backing to at least one side of which a non-fogging pressure-sensitive adhesive composition has been applied.

15 Claims, No Drawings

NON-FOGGING ADHESIVE TAPE

The invention relates to a non-fogging adhesive tape and to its use.

The test in accordance with DIN 75 201 is used to determine the fogging behaviour of materials used in the interior of motor vehicles. Using this method it is also possible to determine the fogging behaviour of liquid, pastelike, pulverulent and solid raw materials, of which the abovementioned materials consist or from which they are produced.

According to the Standard, fogging describes the condensation of evaporated volatile constituents from the interior trim of the motor vehicle onto the windows and especially the windscreen. Under adverse lighting conditions, the fogging may impair the view through the windscreen.

The fogging number F according to DIN 75 201 is the quotient, in per cent, of the 60°-reflectometer reading of a glass plate with fogging and the 60°-reflectometer reading for the same glass plate without fogging.

The condensable component G is the difference obtained from weighing an aluminium foil with and without fogging.

There follows a brief description of the methods used to measure the fogging number.

Method A

The specimen or sample is placed at the bottom of a spoutless glass beaker (referred to below simply as beaker) of defined dimensions.

The beaker is covered with a glass plate on which volatile constituents from the sample specimen or sample are able to condense. This glass plate is cooled.

The beaker prepared in this way is placed for three hours in a bath thermostatted to a test temperature of $(100\pm0.3)°$ C.

The effect of the fogging on the glass plate is detected via the measurement of the 60° reflectometer values. The reference used is the 60° reflectometer readings for the same glass plate without fogging, this glass plate having been carefully cleaned prior to the test.

Method B

The specimen or sample is placed at the bottom of a spoutless glass beaker (referred to below simply as beaker) of defined dimensions.

The beaker is covered with an aluminium foil on which volatile constituents from the sample specimen or sample are able to condense. This aluminium foil is cooled.

The beaker prepared in this way is placed for 16 h in a bath thermostatted to a test temperature of $(100\pm0.3)°$ C.

The mass of the fogging deposit on the aluminium foil is determined quantitatively by weighing the foil before and after the fogging test.

The precise procedure for the tests, together with the test apparatus to be used, is set out in detail in DIN 75201. The content of that Standard is therefore included in the disclosure content of this document by reference.

Determining the fogging behaviour is becoming increasingly important in the automotive industry, because the customer's desire from an ecological standpoint is increasingly to have raw materials in the vehicle which do not give rise to any health hazard.

In addition, such procedures lend themselves very well to exploitation for marketing purposes.

In the motor vehicle industry as well, there are numerous test methods for determining the fogging behaviour. All of these test methods are set down in internal works standards, although these are based to a greater or lesser extent on DIN 75201. Hence, in accordance with Volkswagen AG Central Standard PV 3015, 55 11 6 "Non-metallic materials of the interior trim; determination of condensable components (G)", first published March 1989, the fogging condensate value of materials of the interior vehicle trim is determined by measuring the condensable component as the difference obtained from weighing an aluminium foil with and without a fogging deposit. Volvo, in turn, in accordance with Corporate Standard STD 1027,2711, published August 1994, determines the fogging number by comparing a clean glass plate (degree of light transmission 100%) with a plate covered by outgassed material (degree of light transmission less than 100%). Also known is the Ford Laboratory Test Method (BO 116-03), published May 14, 1990, which likewise measures the outgassed deposit of a test specimen on a plate. All of the documents mentioned and available to the public are incorporated by reference into the disclosure content of this invention.

One segment of those parts of a motor vehicle that are to be tested for fogging behaviour is represented by self-adhesive tapes, which are used, for example, to bandage cable harnesses.

In the cable industry, the use of self-adhesive tapes is widespread. Depending on the task at hand and the field of use, articles with a woven, with a nonwoven or with films of different materials are employed. The coating of these backings with pressure-sensitive self-adhesive compositions is known. From experience, both solvent compositions and hotmelt compositions based on synthetic or natural rubber with tackifier resins and, optionally, fillers are employed here. This type of adhesive tape is installed in all regions of the motor vehicles (for example, engine compartment or interior). A disadvantage affecting all the known articles is the evaporation of volatile constituents on heating. In the interior of the motor vehicles, this process results in a covering on the windows, such that an impairment of the view is classified as a safety risk. In the automotive industry, as already indicated above, this process of evaporation is termed "fogging".

Furthermore, double-sided adhesive tapes based on acrylate adhesive compositions have been known for a long time. For products having a balanced profile of properties, acrylate polymers prepared in solution are mostly employed. The advantage of this procedure is a) by way of controlled monomer compositions, to tailor the properties of the composition to meet certain profiles of properties;

b) by way of the selection of suitable preparation parameters, to establish desired molecular weights.

In the light of the issue of highly volatile constituents, however, these compositions all have marked disadvantages:

a) Unless the drying operation has been excellent, adhesive tapes prepared with these compositions generally have solvent residues of greater than 1% by weight, which are emitted to the environment over the course of time. When sensitive backings are employed, or with thick layers of composition, 100% drying is virtually impossible. Furthermore, with these compositions—and especially when they are applied in thick layers—insufficient drying results in residual contents of unreacted monomers.

b) The polymers prepared by standardized polymerization processes, moreover, have relatively broad molecular mass distributions. As a result, the low molecular mass constituents in particular tend to evaporate out.

U.S. Pat. No. 5,681,654 ("Low-fogging pressure-sensitive adhesive") describes a low-fogging self-adhesive tape. As the adhesive, it is proposed to use a rubber composition whose crosslinking system is based on sulphur. Especially in the context of cable bandaging, this tape also does not protect against interactions with the PVC core insulation. The adhesive tape is not non-fogging but only low-fogging.

The invention is based on the object of providing a non-fogging self-adhesive tape which does not have the disadvantages of the prior art, or at least not to the same extent, and yet is not restricted in its usefulness like the products known to date.

To achieve this object, the invention proposes a non-fogging self-adhesive tape comprising a non-fogging backing to at least one side of which a non-fogging, pressure-sensitive adhesive composition has been applied.

Backings employed here are preferably wovens, nonwovens, films, paper, felts, foams and coextrudates.

As the adhesive composition it has also proved advantageous to use one based on an acrylate hotmelt which has a K value of at least 20, in particular more than 30 (measured in each case in 1% strength by weight solution in toluene, 25° C.), obtainable by concentrating a solution of such a composition to give a system which can be processed as a hotmelt. Concentration can be carried out in appropriately equipped vessels or extruders; in the case of the associated degassing, particular preference is given to a devolatilizing extruder. An adhesive composition of this kind is set out in German Patent Application DE 43 13 008. In an intermediate step, all of the solvent is removed from these acrylate compositions prepared in this way.

In this case the K value is determined in particular in accordance with DIN 53 726.

At the same time, in addition, further highly volatile constituents are removed. After coating from the melt, these compositions have only small proportions of volatile constituents. Consequently, it is possible to adopt all of the monomers/formulations claimed in the abovementioned patent. A further advantage of the compositions described in the patent is to be seen in that they have a high K value and thus a high molecular weight. The person skilled in the art knows that systems with higher molecular weights can be crosslinked more efficiently. Thus there is a corresponding drop in the proportion of volatile constituents.

The solution of the composition can comprise 5–80% by weight, in particular 30–70% by weight, of solvent.

It is preferred to employ customary commercial solvents, especially low-boiling hydrocarbons, ketones, alcohols and/or esters.

Preference is also given to the use of single-screw, twin-screw or multi-screw extruders having one or, in particular, two or more devolatilizing units.

It is possible for benzoin derivatives to be incorporated by polymerization into the adhesive composition based on acrylate hotmelt, examples being benzoin acrylate and benzoin methacrylate, acrylates or methacrylates. Such benzoin derivatives are described in EP 0 578 151 A.

The adhesive composition based on acrylate holtmelt can be UV-crosslinked. However, other types of crosslinking are also possible, such as electron beam crosslinking.

In one particularly preferred embodiment, copolymers of (meth)acrylic acid and esters thereof with 1–25 carbon atoms, maleic, fumaric and/or itaconic acid and/or their esters, substituted (meth)acrylamides, maleic anhydride and other vinyl compounds, such as vinyl esters, especially vinyl acetate, vinyl alcohols and/or vinyl ethers, are used as self-adhesive compositions.

The residual solvent content should be below 1% by weight.

The self-adhesive tape of the invention can be used with particular advantage for bandaging a cable harness, alongside which fields of use in automotive construction are envisaged preferably as a whole.

The use of the self-adhesive tape as a double-sided adhesive carpet laying tape also shows surprisingly good results.

The concept of the invention additionally embraces self-adhesive tapes which are used as medical backings, for instance as a backing material for plasters or bandages. Backing materials found to be suitable for the preparation of medical products are films, for example of polypropylene, polyethylene, polyester, wovens comprising cotton, viscose, viscose acetate, and viscose staple, and also nonwovens comprising viscose or polyesters, and other blends.

The self-adhesive tapes of the invention can be used in a large number of fields, such as single- and double-sided adhesive tapes, unbacked systems, plasters and labels.

With particular advantage, the self-adhesive tape of the invention, coated on one side, can be prepared by a transfer process as disclosed in DE 43 24 748 C2. Here, the adhesive composition is first applied to an intermediate backing, which is an endlessly circulating, anti-adhesively treated carrier tape. The layer of adhesive composition prepared in this way is removed from the carrier tape and laminated to the backing material to give a single-sided adhesive tape which can subsequently be rolled up to give a roll.

From BASF it is possible to obtain such low molecular mass acrylate hotmelt self-adhesive compositions under the designation, for example, of Acronal DS 3458, these compositions having low K values owing to the preparation process.

On the basis of the low K values it was to have been expected that the compositions would have a high proportion of low molecular mass constituents which lead to instances of evaporation. Accordingly, the obvious supposition was that, owing to the difficulty of crosslinkability, not all of the polymer chains would be incorporated into the matrix.

To the great surprise of the person skilled in the art it was found that these compositions, when applied to non-fogging backings and crosslinked, exhibit good adhesion properties and fogging numbers, as, for example, in the preparation of carpet fixings or as adhesive tapes for the bandaging of cable harnesses.

An additional factor, and one which has a positive influence on the effect described, is the extremely low proportion of migrating constituents in the crosslinked composition systems (fogging numbers of about 100).

The intention of the text below is to describe the adhesive tape of the invention with reference to examples without thereby wishing unnecessarily to restrict the invention.

EXAMPLE 1

A UV-crosslinkable acrylate hotmelt adhesive composition is applied at a rate of 50 m/min to a nonwoven backing (Maliwatt, 80 g/m$^2$, fineness 22, for example from the company Cottano) using a rolling-rod die. Two different coating options were tried out here:

In the first method, 80 g/m$^2$ of Acronal DS 3458 were applied directly to the nonwoven. The temperature of the adhesive composition was from 90 to 110° C. and the lower coating shaft was temperature-controlled.

In accordance with the second variant tried out, 50 g/m$^2$ of Acronal 3458 were coated onto a carrier tape and in a temperature-controllable laminating station the adhesive composition was applied to the nonwoven backing at 80° C. under a pressure of 8 bar. This variant made it possible to control the anchorage of the adhesive composition to the backing material in a particularly convenient way, avoiding inadmissible strike through of the composition.

With both variants, crosslinking was conducted with UV lamps (6 medium-pressure Hg lamps each of 120 W/cm) in the subsequent course of the plant line. The degree of crosslinking could be varied by way of the UV dose, so enabling the adhesive properties (including bond strength, unrolling force) to be adjusted individually.

In both variants, the products were wound up to the desired lengths on rods using a rod winder and then processed to the desired widths on an automatic cutter.

The adhesion data for such an article were as follows:
Bond strength on steel: 3.4 N/cm
Bond strength on the reverse: 4.1 N/cm
Unrolling force at 0.3 m/min: 2.6 N/cm
Ultimate tensile strength: 50.2 N/cm
Elongation at UTS: 14.2%

The bond strengths were measured by removing the adhesive tapes at a peel angle of 180° and at a peel rate of 300 mm/min.
Fogging number
  to Ford FLTM BO 116-03 100%
  to Volvo STD1027,2711 100%
  to VW-PV 3015 0.3 mg (target <3 mg)

The fogging number is determined as follows:
A fixed amount of adhesive tape is subjected to a fixed temperature in a water bath in a closed vessel for a fixed period of time. During this process, the glass plate with which the container is closed acquires a deposit which changes the light transmission of the glass plate. The degree of light transmission is indicated in %.

Consequently, a fogging number of 10 is synonymous with only 10% remanent light transmission of the glass plate, and hence is a poor fogging number. Conversely, a fogging number of 100 is of course regarded as optimum, since no detectable evaporation products are present, and such an article can be regarded as non-fogging.

The fogging test is being called for more and more in the automotive industry as a release criterion, which is met by the adhesive tape of the invention.

The adhesive tape produced in this way can be classified as a particularly stable cable harness adhesive tape. The stability of the adhesion data is ensured even after storage at temperature.

In contrast to rubber adhesive compositions, there is no filming. In addition, there is no interaction with the PVC core insulation material.

EXAMPLE 2

A UV-crosslinkable acrylate hotmelt adhesive composition is applied at a rate of 80 m/min to a plaster film backing (polyolefin with an area-based mass of 56 g/m$^2$) using a rolling-rod die.

38 g/m$^2$ of the UV-crosslinkable acrylate hotmelt adhesive composition Acronal DS 3458 were applied to the film using a rolling-rod die. The temperature of the adhesive composition was 145° C. Sufficient anchorage to the backing was ensured by controlling the temperature of the lower coating shaft. The coated material was crosslinked by irradiation with ultraviolet light from four medium-pressure Hg lamps each of 120 W/cm. It was possible to vary the degree of crosslinking by way of the UV dose, thus enabling the appropriate adhesion properties (including bond strength, unrolling force) to be adjusted individually.

The coated film was laminated with a siliconized paper, wound up into a bale and processed into rolls.

The adhesion data of the coated film were as follows:
Bond strength on steel: 3.3 N/cm
Gel value (extraction with toluene) 50%
Fogging number
  SAE J 1756 pt.6 84
  (=DIN 75201 Meth. A)
  SAE J 1756 pt.9
  (=DIN 75201 Meth. B) 0.2 [mg]

The fogging number is determined as described in Example 1.

This material also exhibits a good fogging number with a reduced crosslinking dose. The material can be removed again from the area of skin used for the bond without leaving any residues.

EXAMPLE 3

The Table below indicates two further exemplary embodiments of the adhesive tapes of the invention, which in this case are carpet laying tapes.

| Sample | 4 | 6 |
|---|---|---|
| Backing | polypropylene white, 50 μm | |
| Pretreatment | primer | |
| Release paper | white release paper 80 g/m$^2$ | |
| Mass on lined side → Composition facing carpet | Acronal DS 3458 | |
| Composition on open side → Composition facing substrate | DS 3458 for smooth substrates such as parquet or PVC flooring | DS 3458 for rough substrates such as screeding |
| Coating speed | 40 m/min | 40 m/min |
| Irradiation output | 720 watts | 720 watts |
| Coating weight | 40 g/m$^2$ | 73 g/m$^2$ |
| Bond strength on steel | 2.9 N/cm | 4.3 N/cm |

To determine the properties of the bonded adhesive tape on removal, it was bonded to PVC and stored in a drying cabinet at 40° C. for three days.

The bonded sections were removed from the substrate at different peel angles and at different peel rates (see table below).

| | Peel angle | | | | | | | | | | | |
|---|---|---|---|---|---|---|---|---|---|---|---|---|
| | 90° | | | 180° | | | 90° | | | 180° | | |
| Peel rate [cm/sec] | <10 | 10 | >10 | <10 | 10 | >10 | <10 | 10 | >10 | <10 | 10 | >10 |
| Rating | 1 | 1 | 3 | 1 | 1 | 1 | 1 | 1 | 1 | 1 | 1 | 1 |

The key to the ratings listed as follows:

| Rating | Residues of composition in %* |
|---|---|
| 1 | no residues |
| 2 | <10 (isolated spots of composition) |
| 3 | 10–30 |
| 4 | 31–50 |
| 5 | 51–100 |

*based on the entire bond area

The non-fogging self-adhesive tapes described here, as well, exhibit only minimal to predominantly no residues of composition in accordance with the known methods, as is evident from the above table. Because no fogging occurs with the adhesive tapes of the invention, these self-adhesive tapes can be removed again even from difficult substrates with substantially no residue.

We claim:

1. Non-fogging self-adhesive tape comprising a non-fogging backing having a non-fogging, pressure-sensitive adhesive comprising a crosslinked acrylate hot-melt composition on at least one side.

2. Self-adhesive tape according to claim 1, wherein said backing is a member of the group consisting of wovens, nonwovens, films, paper, felts, foams and coextrudates.

3. Self-adhesive tape according to claim 1, wherein said adhesive composition is a composition which, before crosslinking, has a K value of at least 20.

4. Self-adhesive tape according to claim 3, wherein the adhesive composition is obtained by concentrating a solution of such a composition to form a product which can be processed as a hotmelt.

5. Self-adhesive tape according to claim 4, wherein the solution of the composition comprises 5–80% by weight of a solvent.

6. Self-adhesive tape according to claim 5, wherein said solvent is a member of the group consisting of low boiling hydrocarbons, ketones, alcohols and esters.

7. Self-adhesive tape according to claim 4, wherein a single-screw, twin-screw or multi-screw extruder having one or more devolatizing units is employed to concentrate the solution.

8. Self-adhesive tape according to claim 3, wherein a benzoin derivative is incorporated by polymerization into said adhesive composition.

9. Self-adhesive tape according to claim 1, wherein said adhesive composition is crosslinked chemically by means of radiation.

10. Self-adhesive tape according to claim 3, wherein said self-adhesive composition is selected from the group consisting of copolymers of (meth)acrylic acid and esters thereof with 1–25 carbon atoms, maleic, fumaric, itaconic acid and their esters, substituted (meth)acrylamides, maleic anhydride, vinyl acetate, vinyl alcohols, vinyl ethers and combinations thereof.

11. Self-adhesive tape according to claim 3, wherein the residual solvent content of the adhesive composition is below 1% by weight.

12. A method of bandaging a cable harness which comprises bandaging said cable harness with a self-adhesive tape according to claim 1.

13. A double-sided adhesive carpet laying tape comprising the self-adhesive tape of claim 1.

14. A medical backing comprising the self-adhesive tape of claim 1.

15. Process for producing the self-adhesive tape of claim 1, wherein the adhesive composition is first applied to an intermediate backing, and the layer of adhesive composition prepared in this way is removed from the intermediate backing and laminated to the backing material.

* * * * *

UNITED STATES PATENT AND TRADEMARK OFFICE
CERTIFICATE OF CORRECTION

PATENT NO.    : 6,432,529 B1                                   Page 1 of 1
DATED         : August 13, 2002
INVENTOR(S)   : Christian Harder et al.

It is certified that error appears in the above-identified patent and that said Letters Patent is hereby corrected as shown below:

<u>Title page,</u>
Item [75], Inventors, correct place of residence of 1st and 6th inventors, 1st inventor's residence change "Bredkamp" to -- Hamburg, Germany --; 6th inventor's residence change "Ronneburger Kirchenweg" to -- Hamburg, Germany --.

Signed and Sealed this

Twenty-fifth Day of February, 2003

JAMES E. ROGAN
*Director of the United States Patent and Trademark Office*